(12) United States Patent
Aoshima et al.

(10) Patent No.: US 11,493,078 B2
(45) Date of Patent: Nov. 8, 2022

(54) STUD LOCKING TOOL

(71) Applicants: NEWFREY LLC, New Britain, CT (US); TOYOTA JIDOSHA KABUSHIKI KAISHA, Toyota (JP)

(72) Inventors: Yuuki Aoshima, Toyohashi (JP); Hiroto Matsuno, Toyohashi (JP); Junki Niimoto, Toyota (JP)

(73) Assignee: NEWFREY LLC, New Britain, CT (US)

( * ) Notice: Subject to any disclaimer, the term of this patent is extended or adjusted under 35 U.S.C. 154(b) by 274 days.

(21) Appl. No.: 16/519,144

(22) Filed: Jul. 23, 2019

(65) Prior Publication Data

US 2020/0025236 A1 Jan. 23, 2020

(51) Int. Cl.
*F16B 39/28* (2006.01)
*F16B 5/02* (2006.01)
(Continued)

(52) U.S. Cl.
CPC .............. *F16B 39/28* (2013.01); *F16B 5/02* (2013.01); *F16B 5/0607* (2013.01); *B60R 13/0206* (2013.01)

(58) Field of Classification Search
CPC ........ F16B 5/02; F16B 5/0208; F16B 5/0607; F16B 39/08; F16B 39/10; F16B 39/14; F16B 39/24; F16B 39/28; F16B 39/34; F16B 39/36; Y10S 411/978; Y10S 411/998; B60R 13/0206
(Continued)

(56) References Cited

U.S. PATENT DOCUMENTS 2,883,012 A * 4/1959 Hoffman ............... F16B 37/122
403/408.1
4,490,083 A * 12/1984 Rebish ..................... F16B 5/02
411/338
(Continued)

FOREIGN PATENT DOCUMENTS

EP 2708762 A 3/2014
EP 2886885 A 6/2015
(Continued)

OTHER PUBLICATIONS

EP Search Report dated Dec. 2, 2019.
(Continued)

*Primary Examiner* — Roberta S Delisle
(74) *Attorney, Agent, or Firm* — Michael P. Leary

(57) ABSTRACT

A stud locking tool is equipped with a first clip and a second clip for sandwiching a mounting member. The mounting member is mounted in a member to be mounted by locking the stud. The first clip has a hollow inner cylindrical portion inserted into a mounting hole of the mounting member. A first flange is located at one end of the inner cylinder portion, and a locking claw is formed inside the inner cylindrical portion and engages with a thread of the stud. The second clip has a hollow outer cylinder portion sized to surround the inner cylinder portion of the first clip. A second flange is located at one end of the outer cylinder portion. An engagement claw extends from the outer cylinder portion and engages the first clip. An inclined surface adjacent to the outer cylinder portion includes a stud guiding surface.

17 Claims, 12 Drawing Sheets

(51) Int. Cl.
*F16B 5/06* (2006.01)
*B60R 13/02* (2006.01)

(58) Field of Classification Search
USPC ............ 411/81, 89, 107, 128, 133, 383, 977
See application file for complete search history.

(56) References Cited

U.S. PATENT DOCUMENTS

| | | | | |
|---|---|---|---|---|
| 4,850,778 | A * | 7/1989 | Clough | ............... F16B 37/0842 |
| | | | | 411/433 |
| 4,954,032 | A * | 9/1990 | Morales | .............. F16H 25/2006 |
| | | | | 411/289 |
| 5,711,645 | A * | 1/1998 | Sanbonmatsu | ..... F16B 37/0864 |
| | | | | 411/267 |
| 7,891,151 | B2 * | 2/2011 | Sano | ................... B62D 29/048 |
| | | | | 52/506.05 |
| 9,033,632 | B2 * | 5/2015 | Komsitsky | ............ F16B 5/0208 |
| | | | | 411/182 |
| 9,482,322 | B2 * | 11/2016 | Weikert | .................... F16H 7/18 |
| 9,500,219 | B2 | 11/2016 | Aoshima | |
| 2007/0248436 | A1 * | 10/2007 | Sano | .................... B62D 29/048 |
| | | | | 411/175 |
| 2010/0162537 | A1 * | 7/2010 | Shiba | ...................... F16B 5/065 |
| | | | | 24/458 |
| 2018/0298938 | A1 * | 10/2018 | Droste | .................... F16B 31/02 |
| 2019/0376540 | A1 * | 12/2019 | Santos | ................. F16B 41/002 |

FOREIGN PATENT DOCUMENTS

| | | |
|---|---|---|
| EP | 3054177 A | 8/2016 |
| JP | 2006070975 A | 3/2006 |
| JP | 2009150477 A | 7/2009 |

OTHER PUBLICATIONS

EP Office Action dated Feb. 21, 2022 cited in corresponding EP Application No. 19187530.1.
CN Office Action dated Dec. 28, 2021 cited in corresponding CN Application No. 201910659802.6.

* cited by examiner ically, the present invention relates to a stud locking tool used
STUD LOCKING TOOL

CROSS-REFERENCE TO RELATED APPLICATION

This application claims priority from Japanese Patent Application No. 2018-137634, filed on Jul. 23, 2018 the entire disclosure of which is incorporated herein by reference.

BACKGROUND OF THE INVENTION

The present invention relates to a locking tool used to attach a sheet-like mounting member, such as an undercover, to a mounting member, such as a panel of an automobile, on which a stud such as a screw stud is erected. More specifically, the present invention relates to a stud locking tool used for attaching a mounting member to a member to be mounted by locking the locking tool holding the mounting member to a stud erected on the member to be mounted.

Generally, a locking tool is used to attach a sheet-like mounting member, such as an undercover, to a member to be mounted, such as a panel of a car. In order to attach a wide sheet-like mounting member such as an undercover to the panel, studs are fixed by welding or the like at a plurality of predetermined positions of the member to be mounted; in the mounting member, mounting holes for receiving the studs are formed at predetermined positions. The studs erected on the member to be mounted should pass through the mounting holes of the mounting member, and nuts are engaged on the stud that protrudes from the mounting hole of the mounting member. Thus, the mounting member is mounted on a member to be mounted, such as a panel of a car.

In order to facilitate the mounting operation of the mounting member, a stud locking tool is known, in which a stud is received in a stud receiving hole of the locking tool, and the mounting member is fastened while the mounting member is held from both sides by the locking tool consisting of two parts.

Japanese Unexamined Patent Application Publication No. 2007-292146 ("Patent Document 1") discloses a locking tool (stud locking tool) constituted from a first clip and a second clip. The first clip has an inner cylindrical portion, a flange formed at one end portion of the inner cylindrical portion, and a locking claw inside the inner cylindrical portion. The second clip has an outer cylinder and a flange formed at one end portion of the outer cylinder. The fixing device of Patent Document 1 attaches a sheet-like mounting member so as to be held between the flange of the first clip and the flange of the second clip. By locking the fixture to a plurality of studs erected on a member to be mounted such as a panel of an automobile, the mounting member is attached to the member to be mounted.

The fixture 1' of Patent Document 1 is shown in FIG. 22. The fixture 1' is constituted of a first clip 2 made of a hard synthetic resin integrally molded, and a second clip 3 made of hard synthetic resin integrally molded. The first clip 2 has an inner cylindrical portion 2b, and a flange 2a formed at one end portion of the inner cylindrical portion 2b. The second clip 3 has an outer cylindrical portion 3b, and a flange 3a formed at one end portion of the outer cylindrical portion 3b. The inner cylindrical portion 2b of the first clip 2 is inserted into the mounting hole 9 of the sheet-like mounting member 5, and the inner cylindrical portion 2b of the first clip 2 is inserted into the outer cylindrical portion 3b of the second clip 3. The mounting member 5 is held between the flange 2a of the first clip 2 and the flange 3a of the second clip 3, to connect the first clip 2 and the second clip 3. When a stud 7 erected on the member to be mounted 6 such as a panel of a car is inserted into the stud receiving hole of the fixture 1', the locking claw 4 of the first clip 2 is engaged with the thread of the stud 7 and locked, and the mounting member 5 is mounted on the member to be mounted 6. A hexagonal hole 8 is formed at the center of the flange of the first clip 2, and the fixture 1' can be further tightened or removed from the stud 7 by engaging and rotating the hexagonal wrench 8 with a hexagonal wrench.

The locking tool of Patent Document 1 does not have a tapered portion on the bottom surface for receiving the stud in the stud receiving hole of the first clip. Therefore, when inserting a stud into the stud receiving hole, since the stud is not guided in the stud receiving hole, it is necessary to insert it by aligning the stud position with the stud receiving hole.

Japanese Unexamined Patent Application Publication No. 2006-70975 ("Patent Document 2") discloses a locking tool that facilitates the positioning of the fitting. The fitting is provided with an elastic unit that abuts the mounting hole of the screw attachment fitting on the outer peripheral surface of the stud, the stud projecting from the member to be mounted, and inserted into the mounting holes of the fitting; a clip comprising a locking portion to be locked to the screw portion of the stud; and a guide member for guiding the stud to this clip.

When the stud is pushed into the fitting, the stud slides along the guide member while the elastic portion concurrently expands and contracts, and the lock portion is then inserted into the lock portion in alignment with the axial center of the stud. Thus, the locking portion of the fixture is locked to the threaded portion of the stud.

Even when the axial center of the stud is disposed at a position offset from the center of the mounting hole, when the tip of the stud is pressed against the tapered surface of the guide hole of the guide member, the stud slides along the guide hole and is inserted into the locking portion. However, the guide member of Patent Document 2 has a thin plate shape, and the range in which the stud can be guided is limited. Further, the elastic portion enters the mounting hole of the fitting, and the elastic portion expands and contracts so that the axis of the stud matches the axis. The fitting cannot be easily moved in the direction perpendicular to the axis. Therefore, if there is a variation in the position of the studs, it will be difficult to insert them into the locking portion.

In the structure for guiding the tip of the stud provided in the conventional clip, when the range in which the clip can guide the stud is enlarged, at the time the stud is inserted, the force for sandwiching the attachment between the first clip and the second clip increases, so that the lateral slideability of the stud is impaired, which is a drawback.

Therefore, when attaching a mounting member, such as an undercover, to a member to be mounted, such as a panel of an automobile, on which the stud is erected, a locking tool has been sought wherein the slideability when guiding the stud is not impaired while allowing the stud to be guided in a wide range.

SUMMARY OF THE INVENTION

Therefore, in a stud locking tool for attaching a mounting member, such as an undercover, to a member to be mounted, such as a panel of an automobile on which a stud is erected, one object of the present invention is to provide a stud locking tool which has a wide range for guiding a stud and does not experience deteriorated slideability.

To achieve this object, when the first clip and the second clip of the present invention are assembled and the mounting member is sandwiched between the lower surface of the first flange of the first clip and the upper surface of the second flange of the second clip, the engaging claws of the second clip mesh with the end portion of the inner cylinder portion of the first clip, and the first clip is prevented from coming off with respect to the second clip.

When the first clip is further pushed in, the lower surface of the inner cylinder end portion of the first flange abuts on the bottom surface of the housing of the second clip, and the gap between the first flange and the second flange is controlled to be narrower than a predetermined length. Therefore, the force with which the flange of the first clip and the flange of the second clip sandwich the mounting member between them does not increase beyond a certain level. Consequently, the mounting member can slide relative to the first clip and the second clip.

According to a first aspect of the present invention, a stud locking tool is provided, equipped with a first clip and a second clip, that is attached to a stud; wherein the first clip has a first flange, an inner cylindrical portion adjacent to the first flange and having a through hole, and a locking claw formed on the inner cylindrical portion for engaging the stud; and the second clip has a second flange, an outer cylinder portion having an outer cylinder accommodating portion capable of accommodating the inner cylinder portion, and a slope portion adjacent to the outer cylinder portion and having a guide surface for guiding the end portion of the stud to the through hole.

When the first clip is formed in the cylinder portion and has a locking claw for engaging a stud, and the second clip has an outer cylinder portion having an outer cylinder accommodating portion capable of accommodating the inner cylinder portion, the inner cylinder portion of the first clip can be accommodated inside the outer cylinder portion. When the second clip having an outer diameter larger than the first clip has a slope portion having a guide surface for guiding the end portion of the stud, the range for guiding the stud can be widened.

It is preferable for the inner cylinder portion of the first clip to have a large diameter inner cylindrical portion adjacent to the first flange, a small diameter inner cylinder portion adjacent to the large diameter inner cylinder portion and smaller in diameter than the large diameter inner cylinder portion, and an inner cylinder end portion adjacent to the small diameter inner cylindrical portion and larger in diameter than the small diameter inner cylindrical portion; for the outer cylinder portion of the second clip to have a pair of engaging claws, and for the space interval opposing the bottom surface of the pair of engaging claws to be smaller than the outer diameter of the inner cylinder end portion of the first clip.

When the inner cylinder of the first clip has an inner cylinder end portion adjacent to the small diameter inner cylinder portion and larger in diameter than the small diameter inner cylinder portion, and the outer cylinder portion of the second clip has a pair of engaging claws engaged with the inner cylinder end portion, the first and second clips can be held in an assembled state.

It is preferable for the upper surface of the inner cylinder end portion of the first clip to be a flat surface, for the engaging claw bottom surfaces of the pair of engaging claws of the second clip to be a flat surface, and for the engaging claw bottom surfaces of the pair of engaging claws of the second clip to be positioned above the upper surface of the inner cylindrical portion end portion of the first clip, to prevent the first clip from coming off.

When the engaging claw bottom surfaces of the pair of engaging claws of the second clip are positioned above the upper surface of the inner cylinder end portion of the first clip and the first clip is prevented from coming off, there is no need to worry about the second clip or the first clip coming off.

It is preferable for the distance between the lower surface of the first flange and the upper surface of the second flange to be regulated so as not to approach a certain distance in a state in which the first clip is prevented from coming off.

If a constant distance is maintained between the lower surface of the first flange and the upper surface of the second flange, the mounting member is not tightly sandwiched between the lower surface of the first flange and the upper surface of the second flange, and when the stud locking tool is attached, the mounting member can be slid laterally between the first flange and the second flange.

It is preferable for the height direction (axial) length of the inner cylinder end portion of the first clip to be shorter than the height direction length from the engaging claw bottom surfaces of the engaging claws of the second clip to the bottom surface of the accommodating portion of the outer cylinder accommodating portion, and for the first clip to be movable by a fixed distance in the height direction from the position where the upper surface of the inner cylinder end portion abuts on the bottom surface of the engaging claws, to the position where the lower surface of the inner cylinder end portion abuts on the bottom of the accommodating portion.

When the first clip is movable by a fixed distance in the longitudinal direction, there is no further movement, and the mounting member is not tightly sandwiched between the first and second flanges.

The second aspect of the present invention is a mounting structure in which a mounting member is mounted on a stud erected on a member to be mounted by a stud locking tool equipped with a first clip and a second clip; wherein the first clip has a first flange, an inner cylinder portion adjacent to the first flange and having a stepped inner cylinder end portion, a through hole penetrating from the first flange to the inner cylinder end portion, and locking claws formed on the inner cylindrical portion for engaging the stud; and the second clip has a second flange, an outer cylinder accommodating portion capable of accommodating the inner cylinder portion, an outer cylinder portion having a pair of engaging claws for engaging the inner cylinder end portion, and a slope portion adjacent to the outer cylinder portion and having a guide surface for guiding the end portion of the stud into the through hole; the engaging claw bottom surfaces of the pair of engaging claws of the second clip are positioned above the upper surface of the inner cylindrical end portion of the first clip, so that the first clip is prevented from coming off; the lower surface of the inner cylinder end portion of the first clip abuts on the bottom surface of the accommodating portion of the second clip; the distance between the lower surface of the first flange and the upper surface of the second flange is regulated so as not to be closer than a predetermined distance; the mounting member is sandwiched and attached between the lower surface of the first flange and the upper surface of the second flange; the stud passes through the through hole of the first clip; the locking claws of the first clip engages the threads of the stud; and the studs are held so as not to come off.

According to the above structure, the first clip is prevented from coming off by the pair of engaging claws of the second clip, a fixed distance is maintained between the lower surface of the first flange and the upper surface of the second flange, the mounting member is sandwiched between both the first and second clips from both sides with an appropriate force, and by engaging the locking claws of the first clip with the screw threads of the studs fixed to the mounting member, the mounting member can be easily and reliably mounted on the member to be mounted.

According to the present invention, when attaching a mounting member such as an undercover to a member to be mounted such as a panel of a car, a stud locking tool may be obtained in which the slideability is not impaired even if the distance for guiding the stud is increased.

BRIEF SUMMARY OF THE INVENTION

Hereinafter, embodiments of the present invention will be described with reference to the drawings. The stud locking tool I according to one embodiment of the present invention is constituted of a first clip 10 made of integrally molded hard synthetic resin shown in FIGS. 1 to 8, and a second clip 30 made of integrally molded hard synthetic resin shown in FIGS. 9 to 16.

Figure 1:
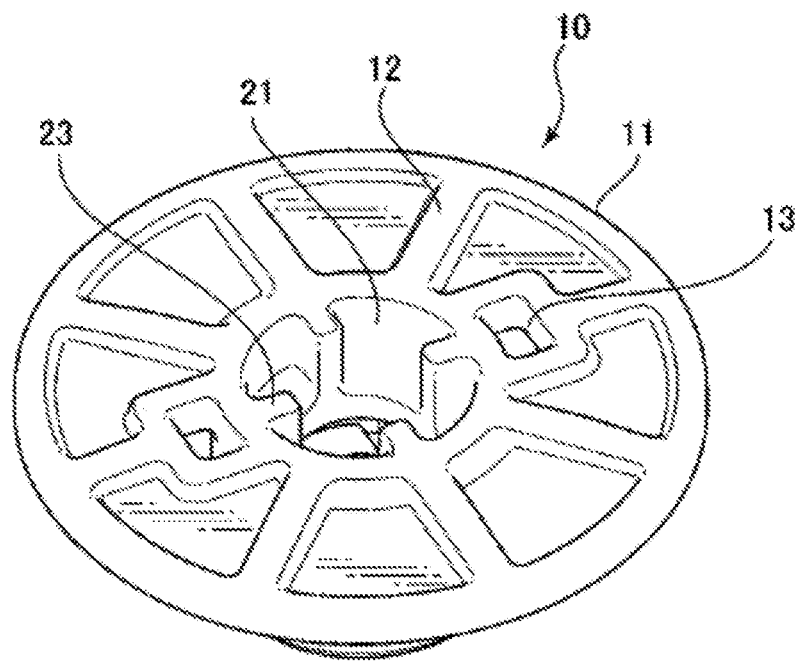
FIG. 1 is a perspective view of a first clip of a stud locking tool according to one embodiment of the present invention.
Figure 2:
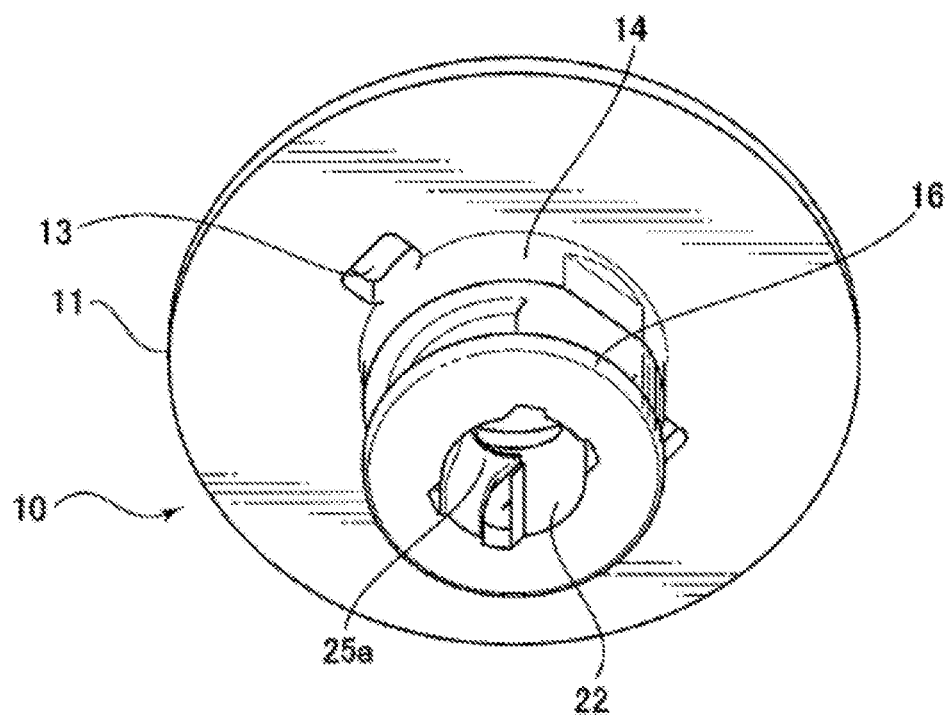
FIG. 2 is a perspective view of the first clip of FIG. 1 as viewed from another direction.
Figure 3:
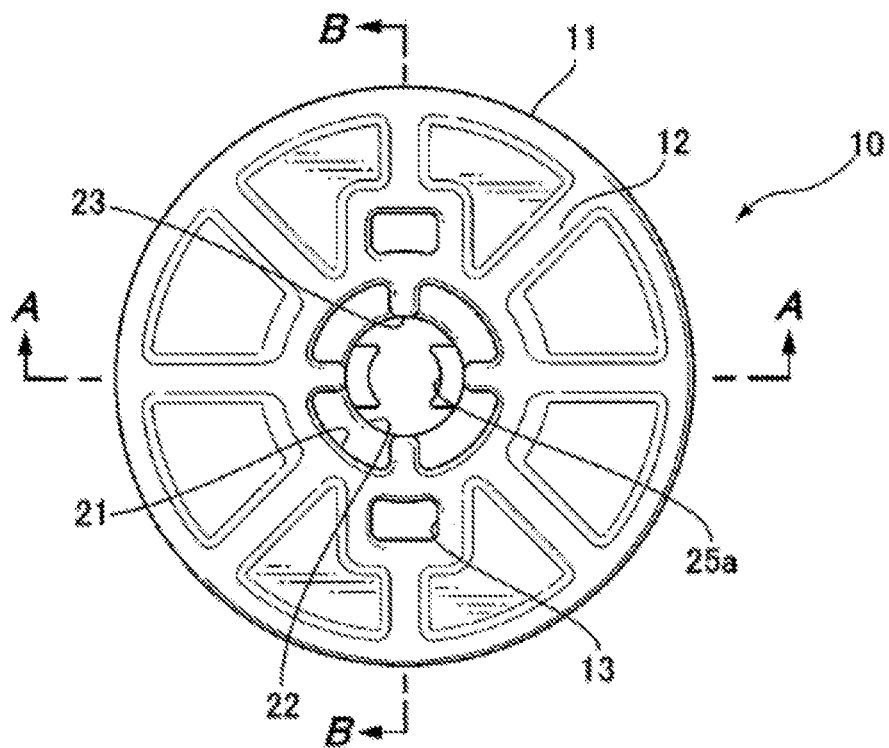
FIG. 3 is a plan view of the first clip of FIG. 1.
Figure 4:
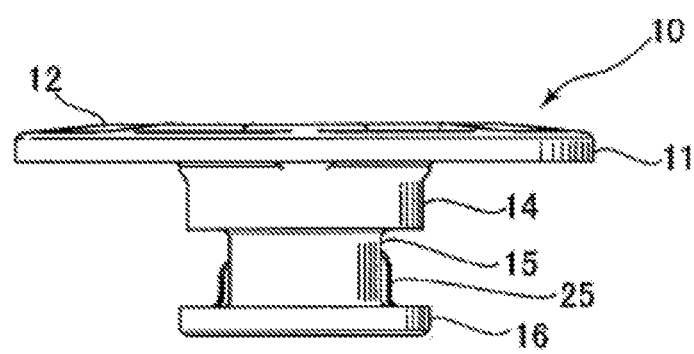
FIG. 4 is a front view of the first clip of FIG. 1.
Figure 5:
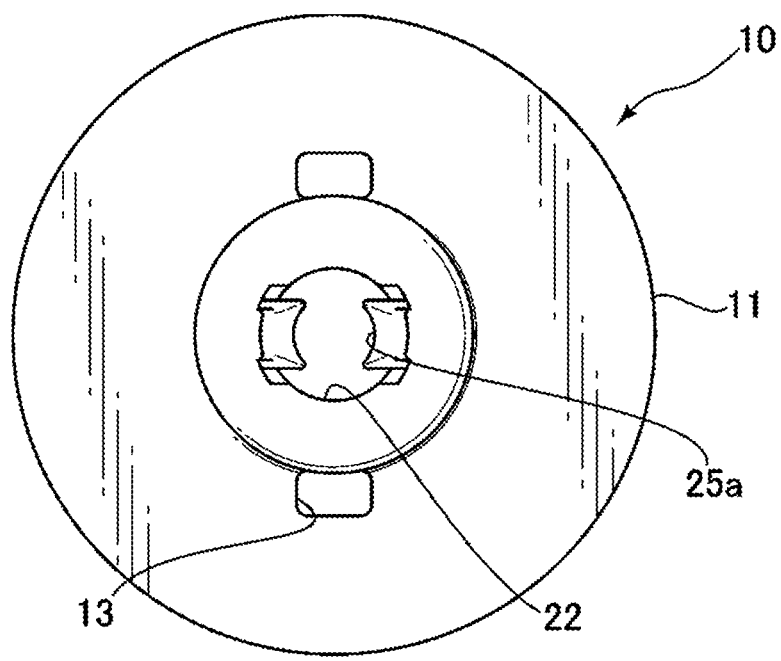
FIG. 5 is a bottom view of the first clip of FIG. 1.
Figure 6:
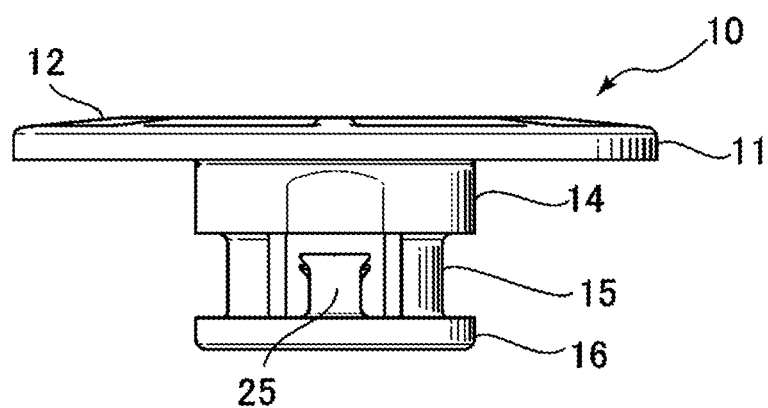
FIG. 6 is a right side view of the first clip of FIG. 1.
Figure 7:
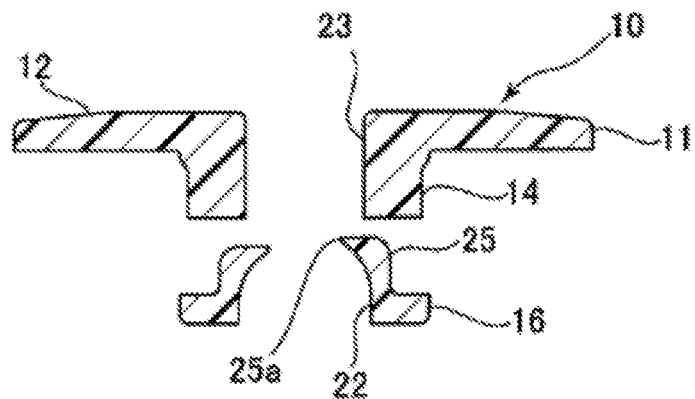
FIG. 7 is an end surface view on line A-A of FIG. 3 of the first clip of FIG. 1.
Figure 8:
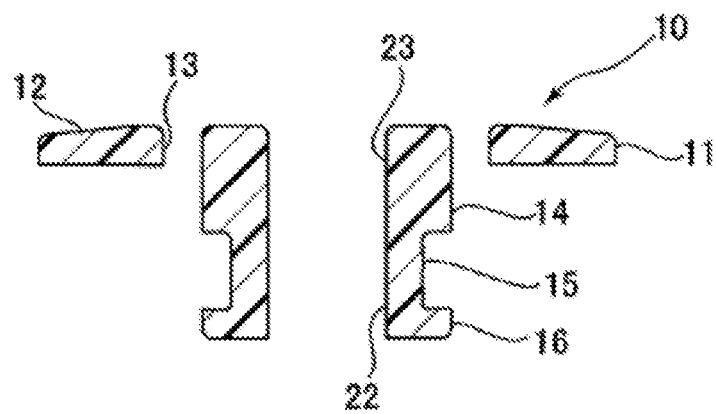
FIG. 8 is an end surface view on line B-B of FIG. 3 of the first clip of FIG. 1.

The first clip 10 will be described with reference to FIGS. 1 to 8. FIG. 1 is a perspective view of a first clip 10 of a stud locking tool I according to one embodiment of the present invention. FIG. 2 is a perspective view of the first clip 10 as viewed from another direction. FIG. 3 is a plan view, FIG. 4 is a front view, FIG. 5 is a bottom view, and FIG. 6 is a right side view of the first clip 10. FIG. 7 is an end surface view of the first clip 10 taken along line A-A in FIG. 3. FIG. 8 is an end surface view of the first clip 10 taken along line B-B in FIG. 3.

As shown in FIGS. 4 and 6, the first clip 10 has a first flange 11 at its upper end. The first flange 11 is in the form of a large-diameter disk. As shown in FIG. 3, eight flange ribs 12 radially extend on the upper surface of the first flange 11. The flange rib 12 reinforces the thin first flange 11. The lower surface of the first flange 11 is a flat surface.

As shown in FIG. 4, the first clip 10 has an inner cylindrical portion adjacent to the first flange 11. The inner cylindrical portion is constituted of a large diameter inner cylindrical portion 14, a small diameter inner cylindrical portion 15, and an inner cylindrical end portion 16.

The large diameter inner cylindrical portion 14 extends in the axial direction from the first flange 11 along the central axis.

The first clip 10 has a small diameter inner cylindrical portion 15 smaller in diameter than the large diameter inner cylindrical portion 14, adjacent to the large diameter inner cylindrical portion 14. As shown in FIG. 8, a step portion to which a step in the perpendicular direction is attached constitutes the area between the large diameter inner cylindrical portion 14 and the small diameter inner cylindrical portion 15. The small diameter inner cylindrical portion 15 is constituted of two parts extending circumferentially around the central axis, and a window is formed between the two parts. An engaging claw 25 described later is formed on the window. The first clip 10 has an inner cylinder portion end 16 adjacent to the small diameter inner cylinder portion 15. A step portion to which a step in the perpendicular direction is attached constitutes the area between the small diameter inner cylindrical portion 15 and the inner cylindrical portion end portion 16. The outer diameter of the inner cylinder end portion 16 is substantially the same as the outer diameter of the large diameter inner cylinder portion 14. The inner cylinder end portion 16 has a short length in the height (axial) direction, and the upper and lower surfaces are flat. As described later, the inner cylinder end portion 16 functions as a stopper on the first clip 10 side.

As shown in FIG. 8, a through hole is formed along the central axis from the first flange 11 of the first clip 10 to the inner cylinder end portion 16. The through hole is a hole for allowing passage of the stud 70. Inside the large diameter hole 21, four protrusions 23 extend in the height direction from the upper surface of the first flange 11 to the end portion of the large diameter hole 21. The first clip 10 can be rotated by placing the tip of a tool such as a driver on the protrusions 23. As shown in FIG. 8, the through hole is a small diameter hole 22 having a small inner diameter, within the small diameter inner cylindrical portion 15 and the inner cylinder end portion 16. The inner diameter of the small diameter hole 22 is equal to the distance between the protrusions 23 facing the inside of the large diameter hole 21.

As shown in FIG. 6 and FIG. 7, a pair of locking claws 25 extend upward from the inner cylinder end portion 16 at a circumferential position where the small diameter inner cylinder portion 15 is not present. The tip of the locking claws 25 is bent inward to form a locking claw end portion 25a. The edge of the locking claw end portion 25a is concavely shaped to fit the outer diameter of the male thread of the stud 70.

The locking claw end portions 25a of the pair of locking claws 25 are different in position in the height (axial) direction and can cope with the difference in height between the left and right of the ridges of the male screw of the stud. Only one locking claw end portion 25a is formed on one locking claw 25. The dimension in the height direction of the locking claw 25 is small, and the overall height of the stud locking tool 1 can be reduced.

A pair of flange holes 13 are formed at opposite positions in the radial direction of the large diameter inner cylindrical portion 14 of the first flange 11. The flange hole 13 is provided for engaging the tool to rotate and remove the first clip 10 and the second clip 30.

The second clip 30 will be described with reference to FIGS. 9 to 16.

Figure 9:
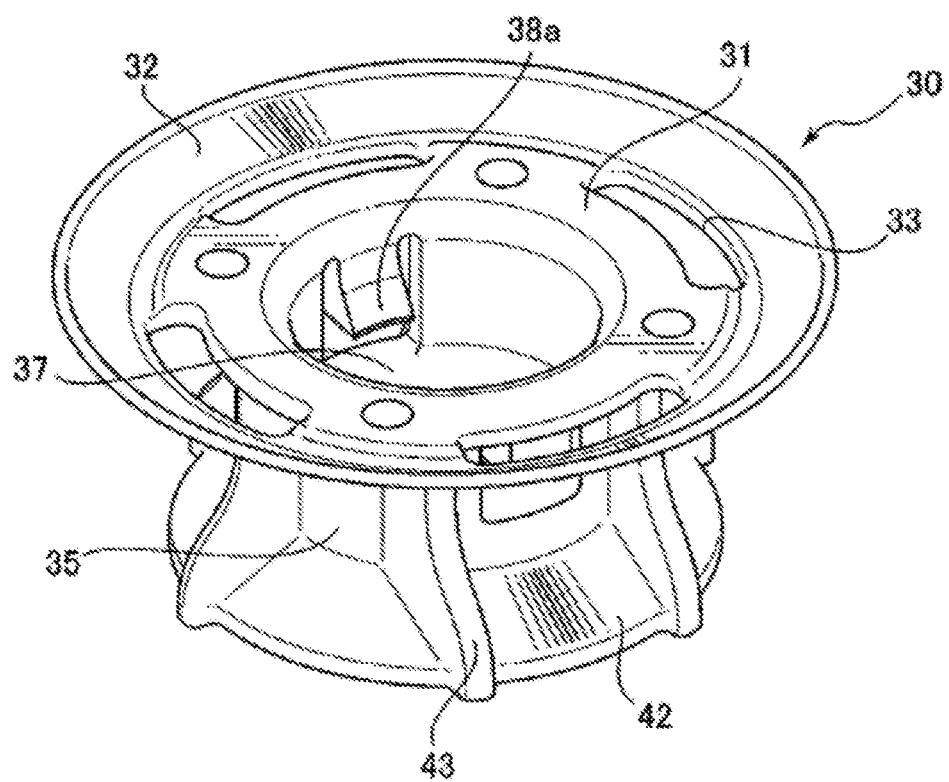
FIG. 9 is a perspective view of a second clip of the stud locking tool of one embodiment of the present invention.
Figure 10:
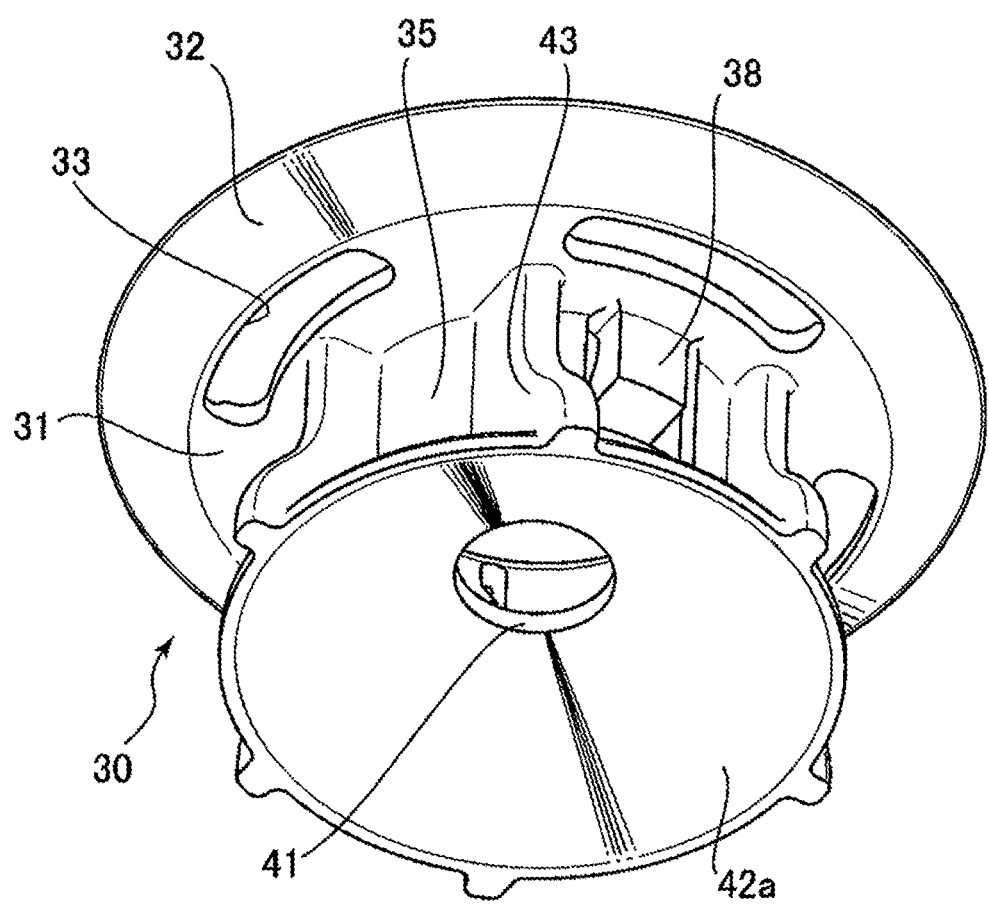
FIG. 10 is a perspective view of the second clip of FIG. 9 as viewed from another direction.
Figure 11:
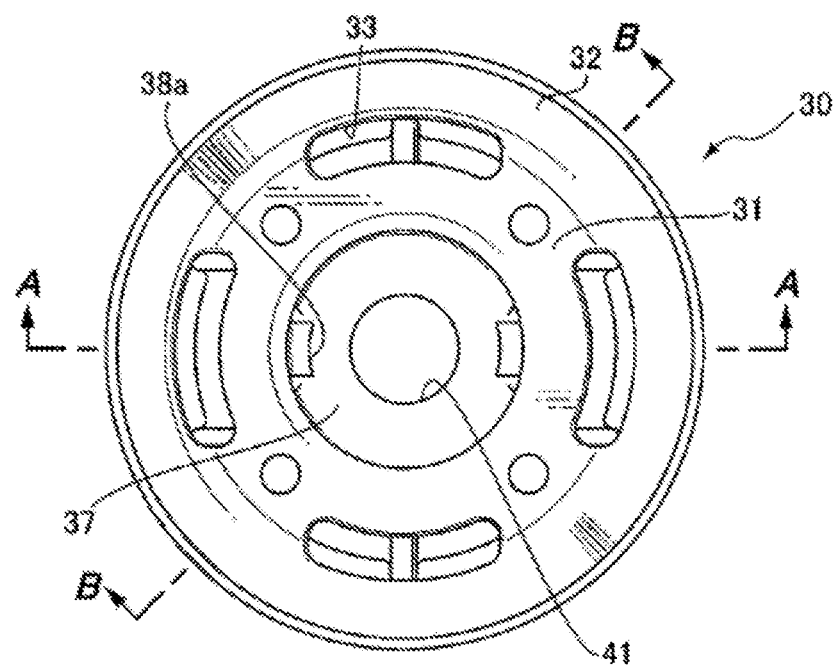
FIG. 11 is a plan view of the second clip of FIG. 9.
Figure 12:
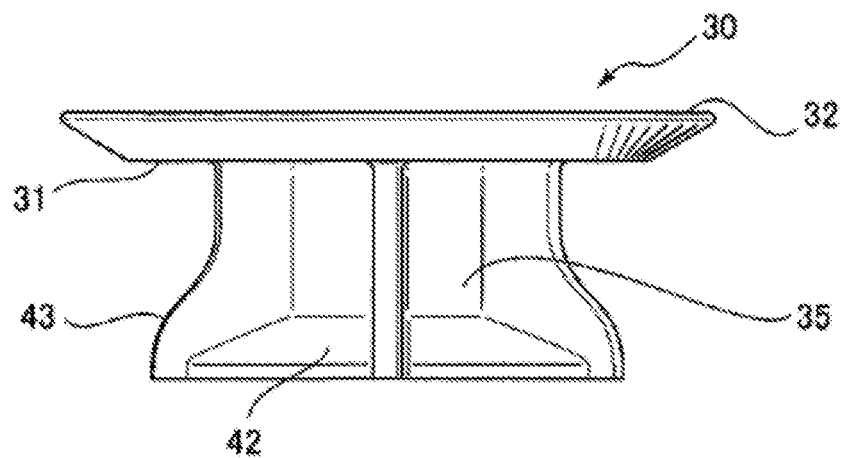
FIG. 12 is a front view of the second clip of FIG. 9.
Figure 13:
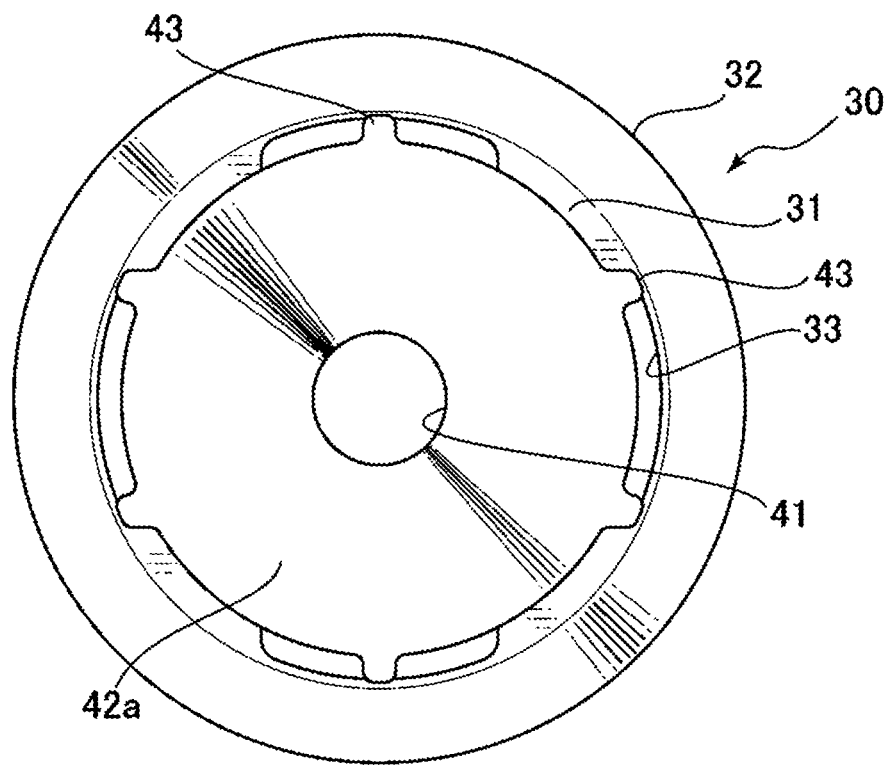
FIG. 13 is a bottom view of the second clip of FIG. 9.
Figure 14:
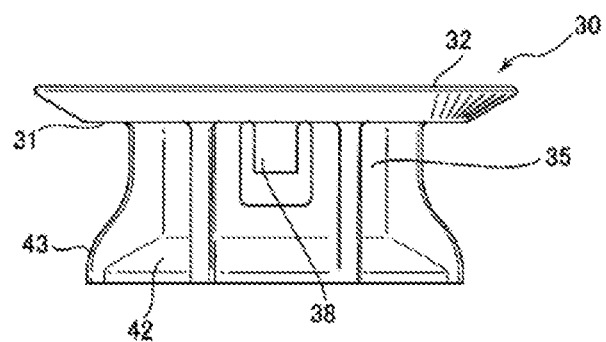
FIG. 14 is a right side view of the second clip of FIG. 9.
Figure 15:
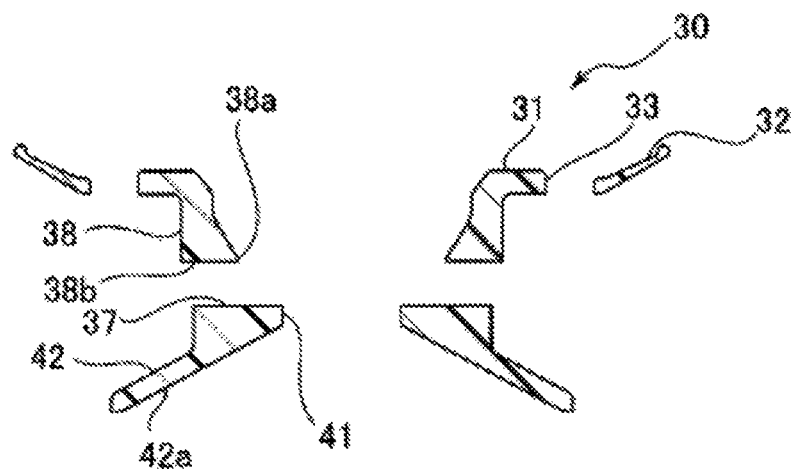
FIG. 15 is an end surface view on line A-A of FIG. 11 of the second clip of FIG. 9.
Figure 16:
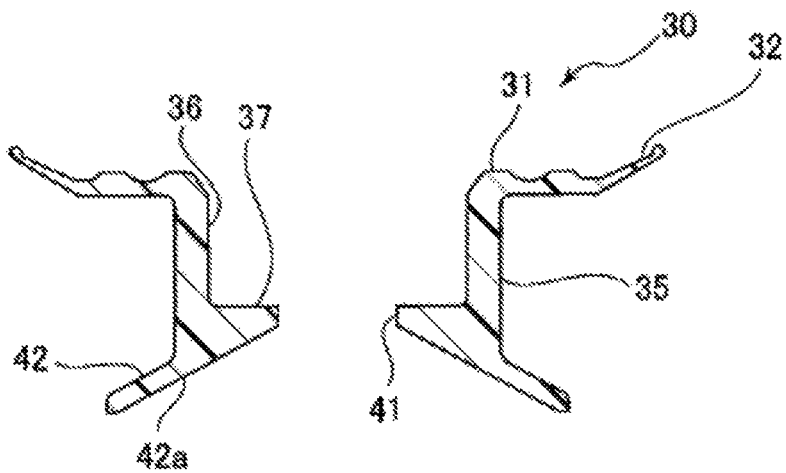
FIG. 16 is an end surface view on line B-B of FIG. 1 of the second clip of FIG. 9.

FIG. 9 is a perspective view of the second clip 30 of the stud locking tool 1 of one embodiment of the present invention. FIG. 10 is a perspective view of the second clip 30 as viewed from another direction. FIG. 11 is a plan view, FIG. 12 is a front view, FIG. 13 is a bottom view, and FIG. 14 is a right side view of the second clip 30. FIG. 15 is an end surface view of the second clip 30 taken along line A-A in FIG. 11. FIG. 16 is an end surface view of the second clip 30 taken along line B-B in FIG. 11.

The second clip 30 has a large diameter second flange 31 at its upper end. The upper surface of the second flange 31 is in contact with the lower surface of the mounting member 51. An elastic edge portion 32 extending obliquely upward is formed at the outer edge of the second flange 31. The elastic edge portion 32 elastically presses the lower surface of the attachment member 51 toward the first flange 11 of the first clip 10.

As shown in FIGS. 9 and 11, around the central axis of the second clip 30 of the second flange 31, four elongated flange holes 33 extending in the circumferential direction are formed. The flange holes 33 help the elastic edge portion 32 to flex elastically. The elastic edge portion 32 and the portion of the second flange 31 inside the flange hole 33 are rigid and have little elastic deformation.

The second clip 30 has an outer cylindrical portion 35 which extends downward and is adjacent to the second flange 31. An outer cylinder accommodating portion 36 is formed inside the outer cylindrical portion 35. The inner diameter of the outer cylinder accommodating portion 36 is larger than the outer diameters of the large diameter inner cylindrical portion 14 and the inner cylindrical end portion 16 of the first clip 10, and the inner cylindrical portion of the first clip 10 can be received. As shown in FIG. 9, the accommodating portion bottom surface 37 which is the bottom surface of the outer cylinder accommodating portion 36 is a flat surface. As described later, the housing bottom surface 37 acts as a stopper on the second clip 30 side. A circular bottom portion hole 41 is formed at the center of the accommodating portion bottom surface 37. The inner diameter of the bottom hole 41 is larger than the outer diameter of the stud 70 so that the stud 70 can be passed therethrough.

As shown in FIG. 14, a window is formed at a position facing the center axis of the outer cylindrical portion 35. A pair of engaging claws 38 are formed in the window. The engaging claws 38 extend downward from the lower surface of the second flange 31 into the window. The pair of engaging claw end portions 38a of the engaging claws 38 extend to the inside of the outer cylinder accommodation portion 36. The distance between the pair of engaging claw end portions 38a of the engaging claws 38 is smaller than the outer diameter of the inner cylindrical end portion 16 of the first clip 10. As shown in FIG. 15, the engaging claw bottom surface 38b of the bottom surface of the engaging claws 38 is a flat surface. When the inner cylinder end portion 16 of the first clip 10 is inserted into the outer cylinder accommodating portion 36 of the second clip 30, the pair of engaging claw end portions 38a engage with the inner cylinder end portion 16, so as not to come off.

As shown in FIG. 12 and FIG. 16, the lower side of the outer cylindrical portion 35 is a sloped portion 42 which conically spreads downward also with the outer surface and the inner surface. The lower surface of the slope portion 42 is a guide surface 42a for guiding the stud 70 toward the bottom hole 41.

In one embodiment, six outer cylinder ribs 43 are formed on the outer side of the outer cylinder portion 35 and the inclined surface portion 42. The outer cylinder rib 43 extends in the lateral (radial) direction and the height (axial) direction and reinforces the outer cylinder portion 35 and the slope portion 42. The shape and number of the outer cylinder ribs 43 are not limited to those shown here.

Figure 17:
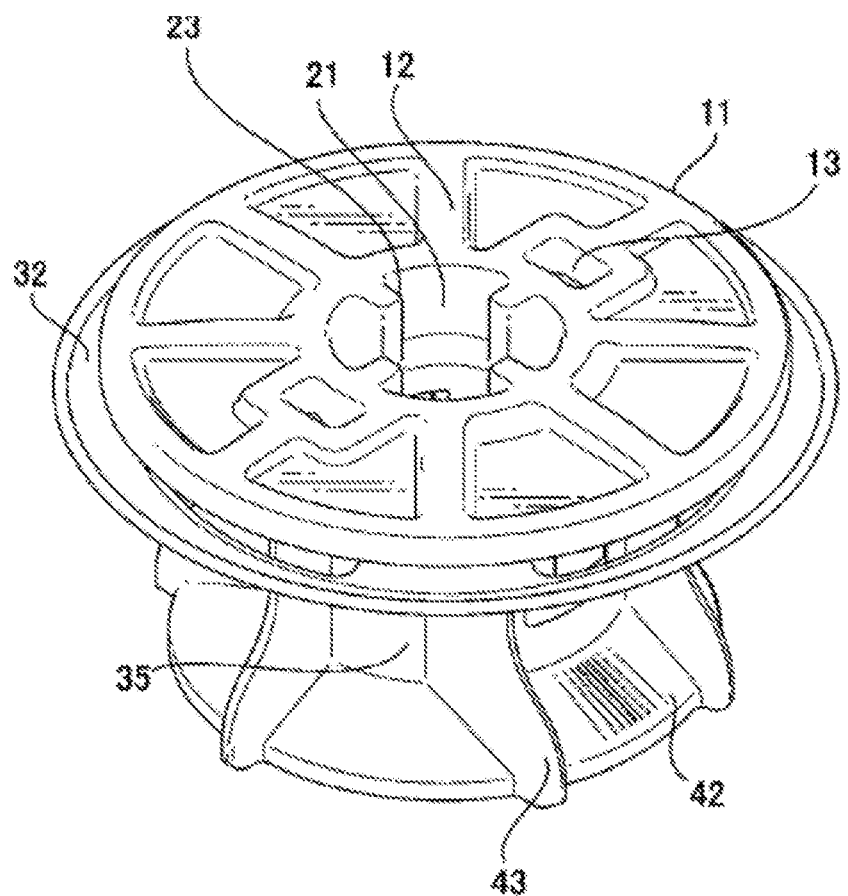
FIG. 17 is a perspective view of a stud locking tool assembled from the first clip of FIG. 1 and the second clip of FIG. 9 according to one embodiment of the present invention.
Figure 18:
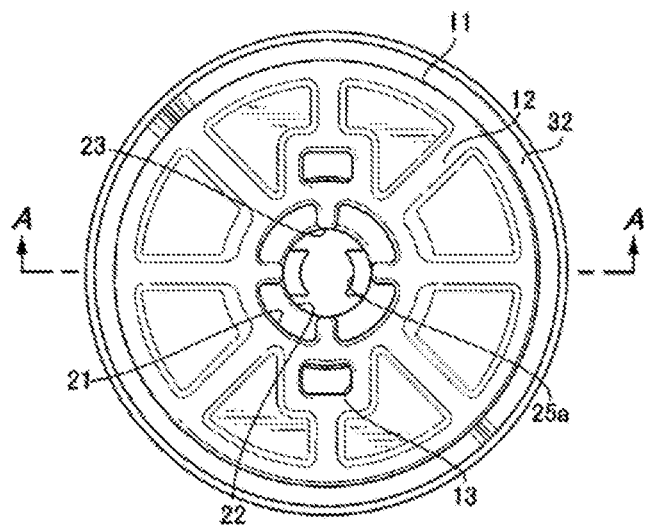
FIG. 18 is a plan view of the stud locking tool of FIG. 17.
Figure 19:
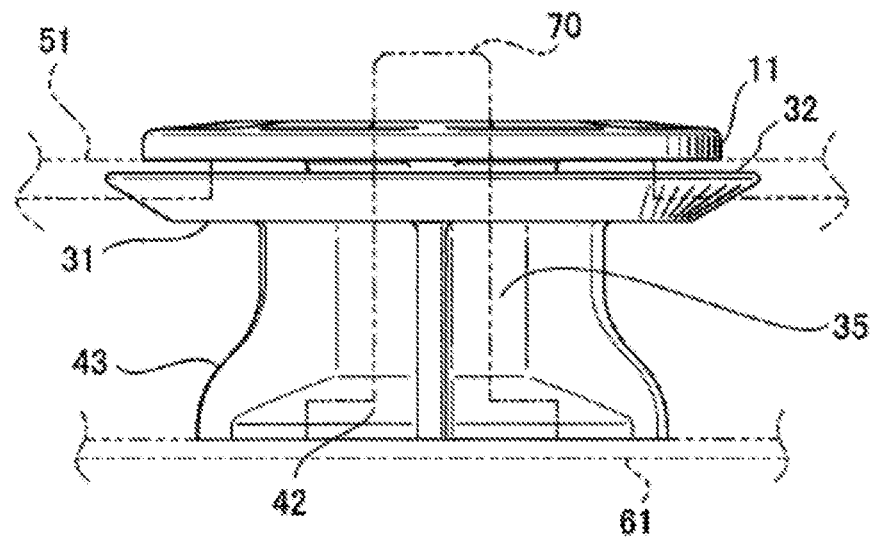
FIG. 19 is a front view of a state in which the stud locking tool is attached to a stud erected on a member to be mounted by sandwiching the mounting member by the stud locking tool of FIG. 17.

FIG. 17 is a perspective view of the stud locking tool 1 in which the first clip 10 and the second clip 30 are assembled. FIG. 18 is a plan view of the stud locking tool I. FIG. 19 is a front view of a state in which the mounting member 51 is attached to the member to be mounted 61 by the stud locking tool I. In the detailed description of the invention, the upper and lower directions in FIG. 19 are referred to as the up/down direction, and side is referred to as the lateral direction. The inner cylinder portion (the large diameter inner cylinder portion 14, the small diameter inner cylinder portion 15, and the inner cylinder end portion 16) of the first clip 10 is housed in the outer cylinder accommodating portion 36 of the second clip 30. The upper surface of the inner cylinder end portion 16 of the first clip 10 is below the engaging claw bottom surface 38b of the engaging claw 38 of the second clip 30. Since the upper surface of the inner cylinder end portion 16 and the engaging claw bottom surface 38b are both flat, the first clip 10 is prevented from coming off. The elastic edge 32 of the second flange 31 is larger in diameter than the first flange 11. There is a gap between the first flange 11 and the second flange 31.

Referring to FIG. 19, the mounting member 51 is sandwiched between the first flange 11 and the second flange 31. The elastic edge 32 of the second flange 31 is pressed against the lower surface of the mounting member 51. The large diameter inner cylindrical portion 14 of the first clip 10 is positioned inside the mounting hole 53 of the mounting member 51. The inner cylinder portion of the first clip 10 is accommodated in the outer cylinder accommodating portion 36 of the second clip 30.

A stud 70 is erected on the member to be mounted 61. The stud 70 extends above the first flange 11 through the bottom hole 41 of the second clip 30, the small diameter hole 22 of the first clip 10, and the large diameter hole 21. The locking claw end portion 25a engages with the male screw of the stud 70, and the stud locking tool 1 is locked.

Figure 20:
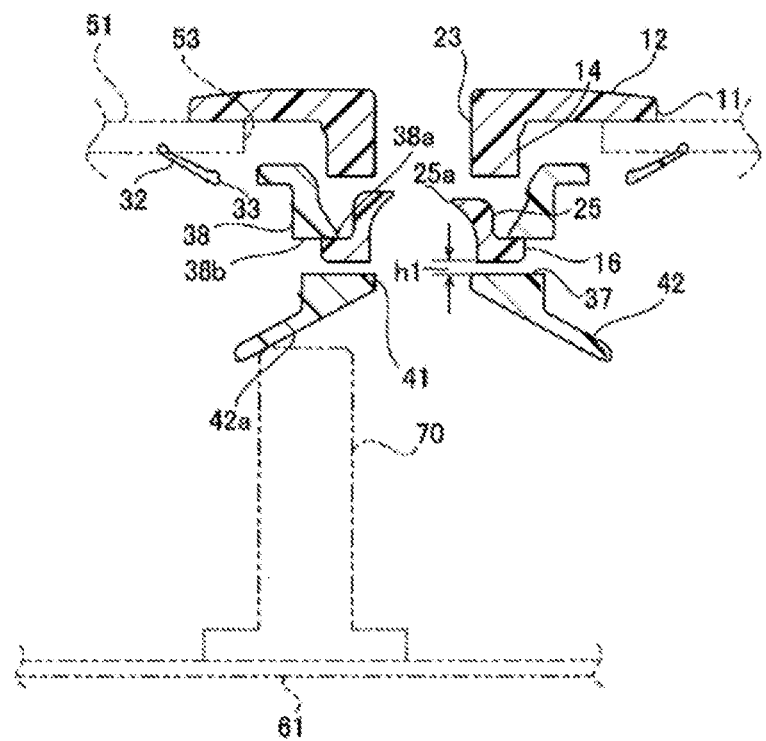
FIG. 20 is an end surface view along the line A-A in FIG. 18 of a stage before sandwiching a mounting member and inserting a stud between a first clip and a second clip of one embodiment of the present invention.
Figure 21:
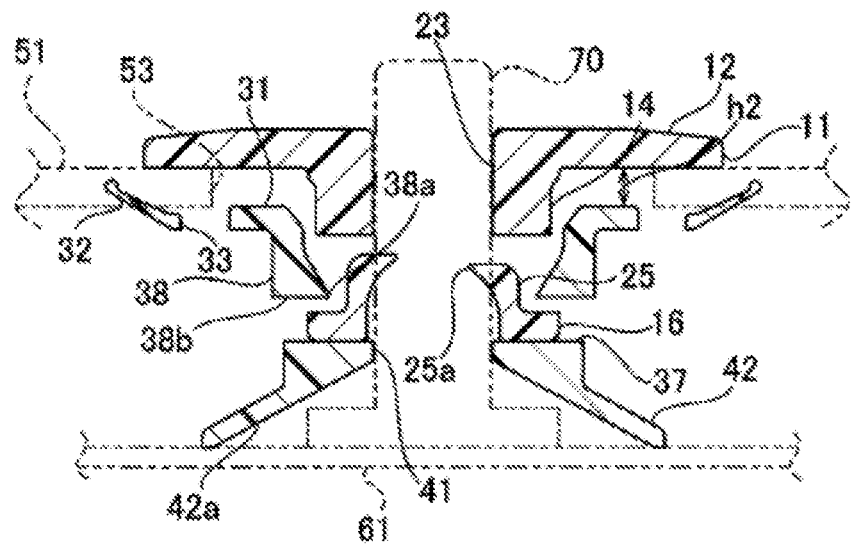
FIG. 21 is an end surface view along the line A-A in FIG. 18 of a stage where the stud is inserted from the stage in FIG. 20.
Figure 22:
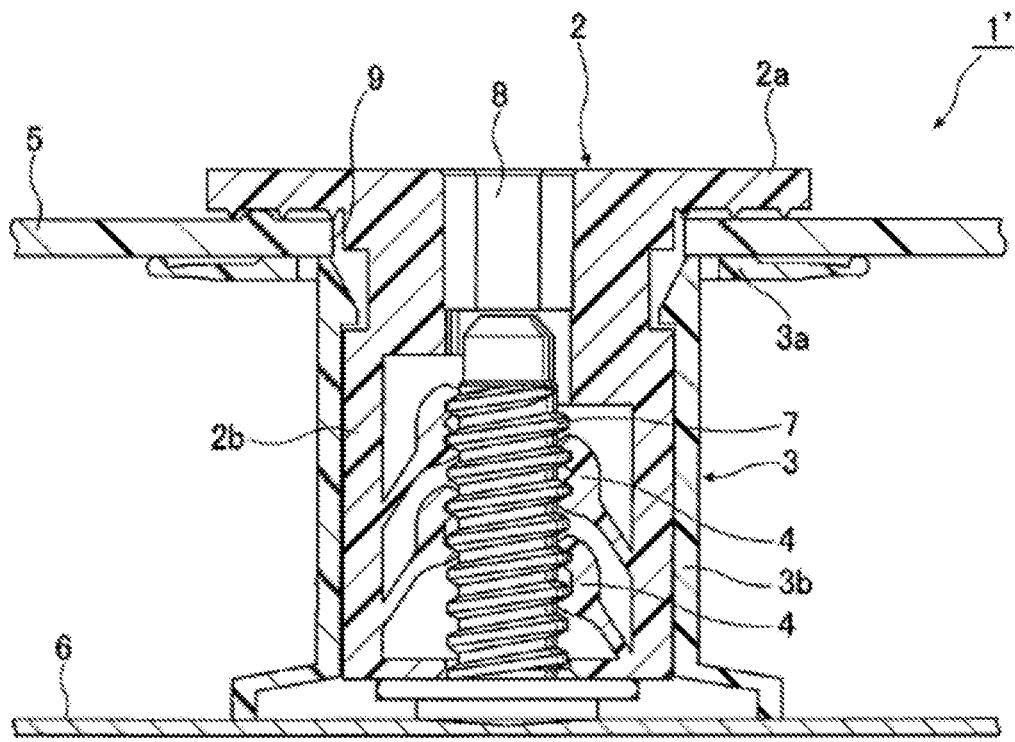
FIG. 22 is a cross-sectional view showing the state of a mounting member attached to a stud-attached member to be mounted using a conventional stud locking tool.

FIG. 20 is an end surface view along the line A-A of FIG. 18 in a stage before the stud 70 is inserted, with the mounting member 51 sandwiched between the first clip 10 and the second clip 30. FIG. 21 is an end surface view taken along the line A-A of FIG. 20, with stud 70 inserted. In FIGS. 20 and 21, the mounting member 51, the mounting hole 53, the member to be mounted 61 and the stud 70 are indicated by two-dot chain lines. Referring to FIGS. 20 and 21, the mounting member 51 is held by the stud locking tool 1 consisting of the first clip 10 and the second clip 30; next, the operation of attaching the mounting member 51 with the stud locking tool 1 to the member to be mounted 61 on which the stud 70 is erected will be described.

Referring to FIG. 20, to mount the stud locking tool 1 to the attachment member 51, the second clip 30 is disposed below the mounting member 51. The position is adjusted so that the mounting hole 53 of the mounting member 51 is above the outer cylinder accommodating portion 36 of the second clip 30. The inner cylindrical portion of the first clip 10 is inserted from the upper side of the mounting hole 53 of the mounting member 51, and is inserted into the outer cylinder accommodating portion 36 of the second clip 30.

The mounting member 51 is sandwiched between the first flange 11 of the first clip 10 and the second flange 31 of the second clip 30 by this operation. Furthermore, when the first clip 10 and the second clip 30 are pushed so as to mutually press against one another, the inner cylinder end portion 16 of the first clip 10 moves the engaging claw end portion 38a of the second clip 30 outward so that it spreads out and emerges below that. The upper surface of the inner cylinder end portion 16 of the first clip 10 engages with the engaging claw bottom surface 38b of the second clip 30, so the first clip 10 is prevented from coming off with respect to the second clip 30.

The mounting member 51 is sandwiched between the first flange 11 of the first clip 10 and the second flange 31 of the second clip 30. In this state, the elastic edge portion 32 of the outer edge of the second flange 31 of the second clip 30 presses the mounting member 51.

As shown in FIG. 20, in the state where the first clip 10 is prevented from coming off, the engaging claw bottom surface 38b of the engaging claw 38 of the second clip 30 abuts on the top surface of the inner cylinder end portion 16 of the first clip 10. At this time, there is a clearance h1 between the lower surface of the inner cylinder end portion 16 of the first clip 10 and the accommodating portion bottom 37 of the second clip 30. The clearance h1 is a length obtained by subtracting the thickness of the inner cylinder end portion 16 of the first clip 10 from the distance from the engaging claw bottom surface 38b to the accommodating portion bottom 37. In this state, when the first clip 10 is pushed into the second clip 30, the first clip 10 and the second clip 30 can be brought close to each other until the clearance h1 becomes zero. That is, in a state in which the first clip 10 and the second clip 30 are prevented from coming off, the first clip 10 can move in the height (axial) direction with respect to the second clip 30 by the gap h1.

When the leading end portion of the stud 70 erected on the member to be mounted 61 is pressed against the guide surface 42a of the second clip 30, the leading end portion of the stud 70 is guided toward the bottom hole 41. As shown in FIG. 21, when the first clip 10 is further pushed toward the stud 70, the end portion of the stud 70 is guided on the guide surface 42a of the second clip 30 and enters the bottom hole 41.

The locking claw 25 formed inside the small diameter inner cylindrical portion 15 is bent outward by the stud 70 to receive the stud 70. When pressed further, the locking claw 25 slides over the screw on the side of the stud 70. The end portion of the stud 70 enters the small diameter hole 22 of the first clip 10, and further, inside the large diameter hole 21, the outer peripheral portion is held by the four projections 23 and exits from the upper surface of the first flange 11. The locking claw end portion 25a engages with the thread of the stud 70, and the mounting member 51 is mounted on the member to be mounted 61.

Although the distance between the first clip 10 and the second clip 30 decreases, when the lower surface of the inner cylinder end portion 16 of the first clip 10 abuts on the bottom surface 37 of the second clip 30, the clearance h1 becomes zero, and the first clip 10 cannot further approach the second clip 30. At this time, there is a space h2 between the lower surface of the first flange 11 of the first clip 10 and the upper surface of the second flange 31 of the second clip 30. The distance h2 is equal to or larger than the thickness of the mounting member 51. Therefore, the mounting member 51 is not crushed. The lower surface of the inner cylinder end portion 16 of the first clip 10 and the housing bottom surface 37 of the second clip 30 act as stoppers.

After mounting the mounting member 51 to the member to be mounted 61, furthermore, a flathead screwdriver is inserted from the upper surface of the first flange 11 of the first clip 10, the projections 23 are engaged, the first clip 10 is rotated about the axis of the stud 70, and the first clip 10 can be engaged more tightly to the locking claw 25.

When the member to be mounted 61 is, for example, a panel of a car, the mounting member 51 to which the stud locking tool 1 has been attached is carried into an assembly line or the like of an automobile. The assembling operator positions the mounting member 51 to which the stud locking tool 1 has been attached at a predetermined position of a member to be mounted 61, such as a panel of a car. The mounting member 51 is positioned such that each of the plurality of studs 70 fixed to the member to be mounted 61 is received in the space inside the stud locking tool 1.

Since the stud locking tool 1 is attached to the mounting member 51 first, the operator does not have to perform an operation with the stud locking tool 1 and may perform the operation of aligning the stud locking tool 1 of the mounting member 51 with the stud 70.

When the end portion of the stud 70 abuts on the sloped portion 42 of the second clip 30, and the mounting member 51 is pressed against the member to be mounted 61, the tip of the stud 70 can be easily guided to the bottom hole 41 of the second clip 30 and further to the small diameter hole 22 of the first clip 10. Each stud 70 is fixed to the stud locking tool 1 simply by pressing the mounting member 51 against the member to be mounted 61.

Even if the position of the stud 70 varies, the tip of the stud is guided by the guide surface 42a. Since a fixed distance is maintained between the first flange 11 and the second flange 31, the mounting member 51 can be moved in the lateral direction without being strongly pressed by the first flange 11 or the second flange 31. Each stud 70 is attached to a stud locking tool 1.

Heretofore, in a stud locking tool equipped with two clips, a guide for allowing variations in the position of the stud 70 has been provided on the inner clip. Because the inner clip has a small outside diameter, the range in which the stud can be guided is narrow. In this embodiment, in order to guide a wide range of studs, a guide surface is provided on the second clip 30 which is an outer clip.

According to the present embodiment, when the stud 70 is inserted from the bottom hole 41 of the second clip 30 into the small diameter hole 22 of the first clip 10, the accommodating portion bottom surface 37 abuts on the lower surface of the inner cylinder end portion 16 so that the first clip 10 cannot be pushed further.

A constant gap can be maintained between the first flange 11 of the first clip 10 and the second flange 31 of the second clip 30, and the mounting member 51 is not compressed more than necessary. Therefore, the mounting member 51 can move in the lateral direction. The ability to guide the studs 70 in the lateral direction is favorable.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A stud locking tool attachable to a stud including an end portion, the stud locking tool comprising:
   a first clip including a first flange, and an inner cylindrical portion extending axially from the first flange and partially defining a first through hole with a first diameter, and a locking claw extending radially into the through hole from the inner cylindrical portion and engageable with the stud when the first clip is installed over the stud; and
   a second clip including a second flange, an outer cylinder portion extending axially from the second flange and partially defining an outer cylinder accommodating portion sized to accommodate the inner cylinder portion, and a slope portion extending radially from a bottom surface of the outer cylinder portion axially distal from the second flange, and the slope portion includes on a radially inward side a guide surface sloping radially inward to a second through hole with a second diameter, the second diameter less than or equal to the first diameter, for guiding the end portion of the stud into the first through hole.

2. The stud locking tool according to claim 1, and further including:
   a large diameter inner cylindrical portion of the first clip located adjacent to the first flange; a small diameter inner cylinder portion of the first clip located adjacent to the large diameter inner cylinder portion, and is smaller in diameter than the large diameter inner cylinder portion; an inner cylindrical end portion of the first clip located adjacent to the small diameter inner cylindrical portion, and is larger in diameter than the small diameter inner cylindrical portion; and
   a pair of engagement claws extending radially inward from the outer cylinder portion of the second clip, each of the pair of engaging claws including a radially inward end portion; and the radial distance between opposing end portions of the pair of engagement claws is smaller than an outer diameter of the inner cylindrical end portion of the first clip.

3. The stud locking tool according to claim 2, wherein: an upper surface of the inner cylinder end portion of the first clip is a first flat surface,
   an engaging claw bottom surfaces of the pair of engaging claws of the second clip are a second flat surface, and the engaging claw bottom surfaces of the pair of engaging claws of the second clip are positioned above the upper surface of the inner cylindrical portion end portion of the first clip, to prevent the first clip from coming off.

4. The stud locking tool according to claim 3, wherein, with the first clip retained, the distance between a lower surface of the first flange and an upper surface of the second flange is not closer than a predetermined distance.

5. The stud locking tool according to claim 4, wherein the axial length of the inner cylinder end portion of the first clip is shorter than the axial length from the engaging claw bottom surfaces of the engaging claws of the second clip to the bottom surface of the accommodating portion of the outer cylinder accommodating portion, and the first clip is movable by a fixed distance in the axial direction from a first position, where the upper surface of the inner cylinder end portion abuts on the bottom surface of the engaging claws, to a second position, where a lower surface of the inner cylinder end portion abuts on the bottom surface of the accommodating portion.

6. The stud locking tool according to claim 2, wherein:
   an upper surface of the inner cylinder end portion of the first clip is a first flat surface, the engaging claw bottom surfaces of the pair of engaging claws of the second clip are a second flat surface, and
   when the inner cylindrical portion of the first clip is inserted from an upper side into the outer cylinder accommodating portion of the second clip, past the engaging claw end portion of the second clip, and the upper surface of the inner cylinder end portion of the first clip engages with the engaging claw bottom surface of the second clip, so the first clip is in a retained state within the second clip; then
   there is a clearance between a lower surface of the inner cylinder end portion of the first clip and the accommodating portion bottom surface of the outer cylinder accommodating portion of the second clip.

7. The stud locking tool according to claim 6, wherein the clearance is a length obtained by subtracting a thickness of the inner cylinder end portion of the first clip from a distance from the engaging claw bottom surface to the accommodating portion bottom surface.

8. The stud locking tool according to claim 6, wherein the retained state:
   the first clip can move in the axial direction with respect to the second clip by the clearance and, the first clip is pushable further into the second clip until the lower surface of the inner cylinder end portion of the first clip contacts the accommodating portion bottom and the clearance becomes zero.

9. The stud locking tool according to claim 1, wherein the outer cylinder portion of second clip further includes a bottom surface extending radially inward between the outer cylinder accommodating portion above and the slope portion below, and the bottom surface surrounds and partially defines the second through hole.

10. The stud locking tool according to claim 8, wherein the bottom surface is a flat bottom surface for the outer cylinder accommodating portion, and the bottom surface acts as a stopper when a lower surface of an inner cylinder end portion abuts the bottom surface so that the first clip cannot be pushed further into the second clip.

11. The stud locking tool according to claim 9 wherein a first state:
   an engaging claw bottom surface of the engaging claw of the second clip abuts on a top surface of an inner cylinder end portion of the first clip;
   there is an axial clearance between a lower surface of the inner cylinder end portion of the first clip and the bottom surface of the second clip; and
   the axial clearance is a length obtained by subtracting a first thickness of the inner cylinder end portion of the first clip from a first distance between the engaging claw bottom surface to the bottom surface of the outer cylinder portion.

12. The stud locking tool according to claim 11 wherein a second state:
the first clip is pushed axially further into the second clip than in the first state, until the axial clearance is zero and the lower surface of the inner cylinder end portion of the first clip abuts on the bottom surface of the second clip, and
there is a space between an under surface of the first flange of the first clip and a top surface of the second flange of the second clip, and the space is equal to or larger than a thickness of a mounting member.

13. A mounting structure assembly, the assembly comprising:
a mounting member partially defining a mounting through hole;
a member to be mounted;
a stud erected on the member to be mounted; and
a stud locking tool securing the mounting member to the stud and member to be mounted, wherein the stud locking tool comprises:
a first clip including a first flange, an inner cylinder portion adjacent to the first flange and having a stepped inner cylinder end portion, a first through hole with a first diameter penetrating from the first flange to the inner cylinder end portion, and locking claws formed on the inner cylindrical portion and engaging the stud;
a second clip including; a second flange, an outer cylinder accommodating portion surrounding the inner cylinder portion, an outer cylinder portion having a pair of engaging claws engaging the inner cylinder end portion, and a slope portion adjacent to the outer cylinder portion and having a guide surface sloping radially inward to a second through hole with a second diameter, the second diameter less than or equal to the first diameter, for guiding the end portion of the stud into the first through hole; and
wherein:
an engaging claw bottom surfaces of the pair of engaging claws of the second clip are positioned above an upper surface of the inner cylindrical end portion of the first clip, so that the first clip is prevented from coming off;
a lower surface of the inner cylinder end portion of the first clip abuts on a bottom surface of the accommodating portion of the second clip;
a distance between a lower surface of the first flange and an upper surface of the second flange is not closer than a predetermined distance; and
wherein the mounting structure assembly the mounting member is sandwiched and attached between the lower surface of the first flange and the upper surface of the second flange, the stud passes through the first through hole of the first clip, the locking claws of the first clip engages the threads of the stud, and the stud is held so that the stud locking tool does not to come off.

14. The mounting structure assembly according to claim 13, wherein, the mounting member further includes a thickness adjacent to the mounting though hole, and, with the first clip retained, the predetermined distance is equal to or greater than the thickness.

15. A stud fastening device attachable to a stud including an end portion, the stud fastening device comprising:
a first clip including a first flange, an inner cylindrical part adjacent to the first flange and partially defining a through hole, and locking claws formed on the inner cylindrical part for engaging with the stud;
a second clip including a second flange, an outer cylindrical part having an outer cylinder housing part capable of housing the inner cylindrical part and, a sloped part adjacent to the outer cylindrical part and having a guide surface for guiding the tip of the stud to the through hole; and
wherein the inner cylindrical part of the first clip further includes:
a large-diameter inner cylindrical portion located adjacent to the first flange and defining a first diameter,
a small-diameter inner cylindrical portion located adjacent to the large-diameter inner cylindrical portion and defining a second diameter smaller than the first diameter, and
an inner cylindrical end portion located adjacent to the small-diameter inner cylindrical portion and defining a third diameter larger than second diameter; and
wherein the outer cylindrical part of the second clip further includes:
a pair of engaging claws, and the radial distance between opposing end portions of the engaging claws of the pair of engaging claws facing each other is smaller than the third diameter, and
wherein a thickness in the axial direction of the inner cylindrical end portion of the first clip is less than the distance in the axial direction from an under surface of the engaging claws to a bottom surface of the outer cylinder housing part of the second clip; and
wherein the first clip is movable within the second clip by a fixed distance in the axial direction from a first position, where an upper surface on the inner cylindrical end portion contacts the under surface of the engaging claws, to a second position, where the lower surface of the inner cylindrical end portion contacts the bottom surface of the outer cylinder housing part.

16. The stud fastening device according to claim 15, wherein the upper surface on the inner cylindrical end portion of the first clip is flat, and the under surface the engaging claw of the pair of engaging claws of the second clip are flat, and, the first clip is fastened to the second clip when the under surface of the pair of engaging claws of the second clip are positioned above the upper surface of the inner cylindrical end portion of the first clip.

17. The stud fastening device according to claim 16, wherein, with the first clip fastened to the second clip, the axial distance between a lower surface of the first flange and an upper surface of the second flange is regulated so that the flanges do not come closer than a certain distance.

* * * * *